United States Patent
De Vries

(10) Patent No.: US 6,217,499 B1
(45) Date of Patent: Apr. 17, 2001

(54) MANUFACTURE OF A FLEXIBLE CONTAINER

(75) Inventor: Hans De Vries, Drachten (NL)

(73) Assignee: Dunlop Enerka B.V., Drachten (NL)

( * ) Notice: Subject to any disclaimer, the term of this patent is extended or adjusted under 35 U.S.C. 154(b) by 0 days.

(21) Appl. No.: 09/029,654

(22) PCT Filed: Jun. 26, 1997

(86) PCT No.: PCT/IB97/00853

§ 371 Date: Feb. 27, 1998

§ 102(e) Date: Feb. 27, 1998

(87) PCT Pub. No.: WO98/00285

PCT Pub. Date: Jan. 8, 1998

(30) Foreign Application Priority Data

Jun. 28, 1996 (GB) .................................................. 9613625

(51) Int. Cl.$^7$ .............................. B31B 19/64; B29C 35/02
(52) U.S. Cl. ..................... 493/213; 493/210; 493/929; 493/931; 493/933
(58) Field of Search ................................. 493/931, 932, 493/933, 929, 210, 209, 213

(56) References Cited

U.S. PATENT DOCUMENTS

| | | | |
|---|---|---|---|
| Re. 34,117 | * 10/1992 | Martin et al. ........................ 493/194 |
| 3,016,806 | * 1/1962 | Schoen et al. ........................... 93/35 |
| 3,523,848 | * 8/1970 | Huff et al. ............................. 156/156 |
| 3,610,307 | * 10/1971 | Huff et al. ............................. 150/2.1 |
| 3,702,484 | * 11/1972 | Tobinick et al. ......................... 5/348 |
| 3,815,165 | * 6/1974 | Tobinick et al. ......................... 5/348 |
| 3,889,684 | * 6/1975 | Lebold ................................ 128/402 |
| 3,914,367 | * 10/1975 | Himmelman ........................ 264/219 |
| 3,998,684 | * 12/1976 | McRight .............................. 156/253 |
| 4,252,910 | * 2/1981 | Schaefer .............................. 521/145 |
| 4,918,904 | * 4/1990 | Pharo ................................... 53/472 |
| 5,123,987 | * 6/1992 | Mattia ................................ 156/234 |
| 5,254,074 | * 10/1993 | Landers et al. ...................... 493/213 |

\* cited by examiner

Primary Examiner—Daniel C. Crane
(74) Attorney, Agent, or Firm—Young & Thompson

(57) ABSTRACT

A method for the manufacture of a flexible container suitable for use as a water bed for livestock comprises providing a first layer of a flexible polymeric material, applying a mask insert to an inner zone of a first surface of the first layer, the mask insert being arranged spaced from edges of the first layer thereby to define a substantially continuous boundary zone, arranging a second layer of flexible polymeric material to lie adjacent the first layer with the mask insert sandwiched therebetween, and subjecting the assembly so formed to a treatment operation thereby to form a face to face seal between the boundary zone and the confronting surface region of the second layer.

18 Claims, 2 Drawing Sheets

MANUFACTURE OF A FLEXIBLE CONTAINER

This application is a 371 of PCT/IB97/00853, filed Jun. 26, 1997.

FIELD OF THE INVENTION

This invention relates to a method for the manufacture of a flexible container such as a flexible fluid container and in particular, though not exclusively, to the manufacture of a flexible fluid container suitable for use as a water bed.

BACKGROUND OF THE INVENTION

Many procedures are known for the manufacture of flexible fluid containers, such as the use of a moulding technique to mould plastics material. However, many of the known techniques are not suitable for the manufacture of heavy duty type fluid containers such as water beds, particularly water beds for cows and other heavy weight livestock.

The known techniques for manufacture of flexible fluid containers also often are suitable only for the manufacture of individual water beds. In the manufacture of, for example, livestock water beds, it may be desired to provide an integral arrangement of a plurality of water beds.

OBJECTS OF THE INVENTION

The present invention seeks to provide an improved method of the manufacture of a flexible container which is suitable for the manufacture of a fluid container of a heavy duty type. It seeks also to provide a method suitable for the manufacture of an integral arrangement of a plurality of a flexible containers.

SUMMARY OF THE INVENTION

One aspect of the present invention provides a method for the manufacture of a flexible container comprising:
  providing a first layer of flexible polymeric material;
  applying mask means to an inner zone of a first surface of said layer, said mask means being arranged spaced from edges of the first layer thereby to define a substantially continuous boundary zone;
  providing a second layer of flexible polymeric material;
  arranging said second layer to lie adjacent said first layer with the mask means sandwiched therebetween, and
  subjecting the assembly so formed to a treatment operation thereby to form a face to face seal between said boundary zone and confronting surface region of the second layer.

The invention teaches that preferably each of the first and second layers is of vulcanisable polymeric material and that said treatment operation comprises the application of heat and pressure to vulcanise the polymeric material, at least in the region of said confronting boundary zone surfaces, and thereby form a vulcanised joint between the two layers.

One or both of the first and second layers may be reinforced.

The two layers may be layers of substantially wholly unvulcanised polymeric material which are each vulcanised and become united with one another at the boundary zone during a vulcanisation operation. One or each of the layers may be of a kind having a reinforcement structure which is embedded in polymeric material. Preferably in each layer the embedded reinforcement lies sandwiched between two layers of polymeric material. A layer may comprise calendered material.

Suitable polymeric materials include:- NR, SBR, BR, NBR/PVC, BIIR, CIIR, IR, EPR, EPDM, CR, SIR, wherein said abbreviations have the following meanings:
NR Natural Rubber
SBR Styrene-Butadiene Rubber
BR Butadiene Rubber
NBR/PVC a blend of Acrylonitrile-butadiene rubber and Polyvinylchloride
BIIR Bromine-Isoprene-Isobutylene Rubber
CIIR Chlorine-Isoprene-Isobutylene Rubber
IR Isoprene Rubber
EPR Ethylene-Propylene Rubber
EPDM Ethylene-Propylene-Diene Monomer
CR Chloroprene Rubber
SIR Silicone Rubbers Use may be made also of blends of materials, including blends of the foregoing. The materials are suitable also for an outer surface of the flexible container, i.e. to lie at least outwards of any embedded reinforcement structure, and also for forming an inward facing surface.

The reinforcement structure may be a reinforcement fabric known per se. It may comprise a single layer of reinforcement fabric which provides reinforcement strength in two mutually perpendicular directions. The reinforcement structure may comprise a plurality of reinforcement fabric layers in which case one layer may provide reinforcement in a first direction and a second layer may provide reinforcement in a direction substantially perpendicular to said first direction.

Outwardly facing surfaces of the flexible fluid container may be provided with a profiled surface, for example during a vulcanisation procedure. Examples of methods for providing a profiled surface include the use of a press plate and the use of an impression cloth. Vulcanisation may be performed in press means with a layer of impression fabric lying between a press face and an outer face of at least one of the first and second layers whereby during vulcanisation said outwardly facing surface of a first or second layer has imparted thereto a surface texture representative of the impressed and subsequently removed fabric layer.

The mask means may comprise a layer of a material which does not adhere to the confronting surface materials of either the first or second layers. Typically it is a substantially continuous, free of cut-outs, layer so as to prevent confronting surfaces of the first and second layers coming into contact inwards of the boundary zone.

Suitable materials for the mask means include water-tight rubber, BIIR, CIIR, IIR, polyester, nylon 6, nylon 6.6, rayon, aramide, polyvinyl acetate, polyethylene, polypropylene, cellulose-acetate, silicons, teflon and metal foils.

The mask means may comprise two layers of a material which optionally, and preferably, adheres to a confronting surface of one of said first or second layers but which does not adhere to itself when subject to the temperature and pressure of a vulcanisation operation. Suitable materials include the aforementioned materials which inherently do not adhere to the material(s) of said first and second layers.

The mask means may be arranged to extend locally to an edge of the first layer to provide a localised region at which the boundary zone of the first layer does not become adhered to the second layer. This creates an embryonic access passage so that, in subsequent use of the container, fluid may be introduced into or removed from the fluid chamber created between said first and second layers.

Alternatively, instead of providing that the mask means extends locally through the boundary zone, a tube may be positioned to extend through the boundary zone prior to the first and second layers being united together. That tube may be of a flexible type which may adopt a lay flat configuration during the forementioned treatment operation, or may be a rigid tube such as a tube of e.g. a plastics, or a metallic material such as stainless steel. If the mask means comprises a pair of superimposed layers, an inner end of the tube preferably is arranged to lie between those layers.

The method may be applied to the manufacture of a flexible container which is to contain a fluid which may be a liquid or gas. It may be a container which is to be filled with a high viscosity material, for example of a paste like consistency. It may be filled with a medium which is or becomes a foam; that foam may be a resilient foam.

The present invention provides also a method for the manufacture of a flexible container of a multi-chamber type comprising:

providing a first elongate layer of flexible polymeric material;

applying a plurality of mask means to said first layer to lie in a longitudinally extending series along the length the first elongate layer with successive mask means spaced from one another and each spaced from longitudinal side edges of the first layer;

providing a second elongate layer of flexible polymeric material; arranging said second layer to lie adjacent said first layer with the plurality of mask means sandwiched therebetween, and subjecting the assembly so for a treatment operation to form face to face fluid seals between the first and second elongate layers at boundary zones around each mask means.

Preferably the method comprises also providing means for independent fluid communication with each fluid chamber zone created in the region of each mask means. The method may further comprises providing that each communication means extends to a common longitudinally extended edge of the assembly.

The first and second elongate layers may be of vulcanisable material and may be vulcanised in a step-wise manner in which a first part of the length of the assembled layers is introduced into an elongate platen press, subjected to heat and pressure and then moved either out from the press or further along the length of the press so that another portion of unvulcanised material is introduced into the press. The assembled material therefore moves in a step-wise manner through the press. Alternative vulcanisation procedures include the use of a Rotocure type press or a long length flat continuous cure press. Subsequent to vulcanisation, the resulting multi chamber assembly may be rolled for storage and transportation.

The method of the invention further provides that either prior or subsequent to said treatment operation, valve means may be provided for control of fluid into and out of the fluid chamber formed in the region of each mask means. The method may comprise providing a sealing device to stop flow of fluid into and out of the fluid chamber region until the fluid chamber region is to occupied by a liquid; prior introduction of unwanted air can thereby avoided.

The invention teaches that each boundary zone preferably is provided with a width of at least 10 mm, typically at least 50 mm. The width typically will be less than 200 mm, for example in the order of 100 mm, but may be significantly more, e.g. in the order of 1000 mm, to provide a zone for securing to a floor or other location point.

At least a part of the boundary zone may have a width in the range 70 to 110 mm.

In the case of manufacture of an elongate assembly of a plurality of fluid chamber regions, it is envisaged that some of the successive chamber sections will each be spaced by an intermediate boundary zone of a width corresponding to that at an edge region and that some intermediate boundary zones will be of a greater width, for example in the range 1.5 to 2 times of the edge boundary width at positions at which, for example, one series of containers is to be cut from another container or series of containers.

It is further provided that intermediate boundary zones of greater width are provided at pre-selected positions spaced along the length of the assembly at positions corresponding to those at which the elongate assembly is to cut transversely to provide sections, i.e. groups of water bed mats of a required length, or to provide individual mats.

BRIEF DESCRIPTION OF THE DRAWINGS

Embodiments of the invention will now be described, by way of example, with reference to the accompanying diagrammatic drawings in which.

DETAILED DESCRIPTION OF THE INVENTION

Figure 1:
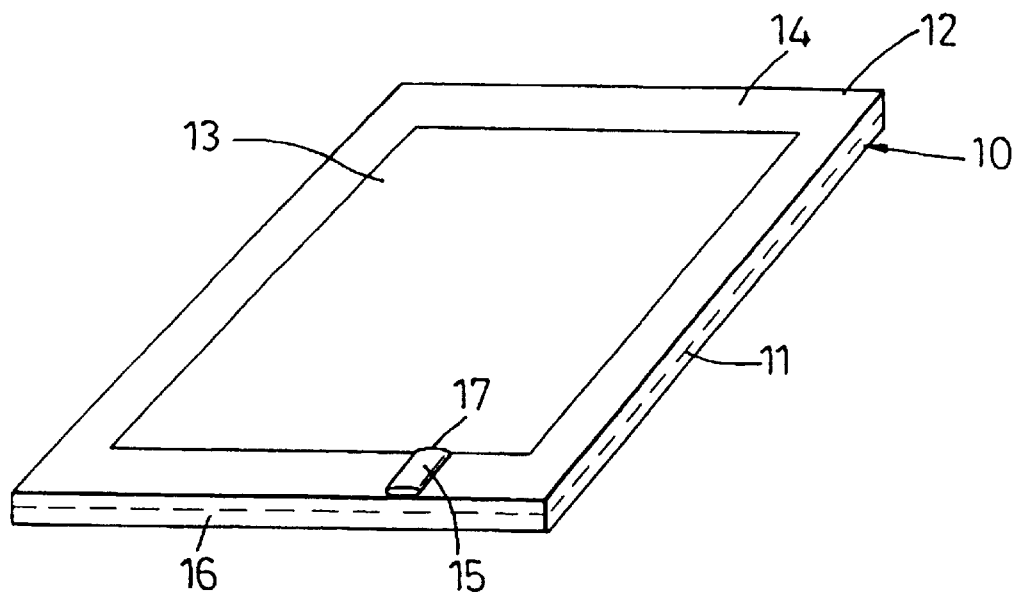
FIG. 1 is a perspective part of a water bed during a first stage of manufacture.
Figure 2:
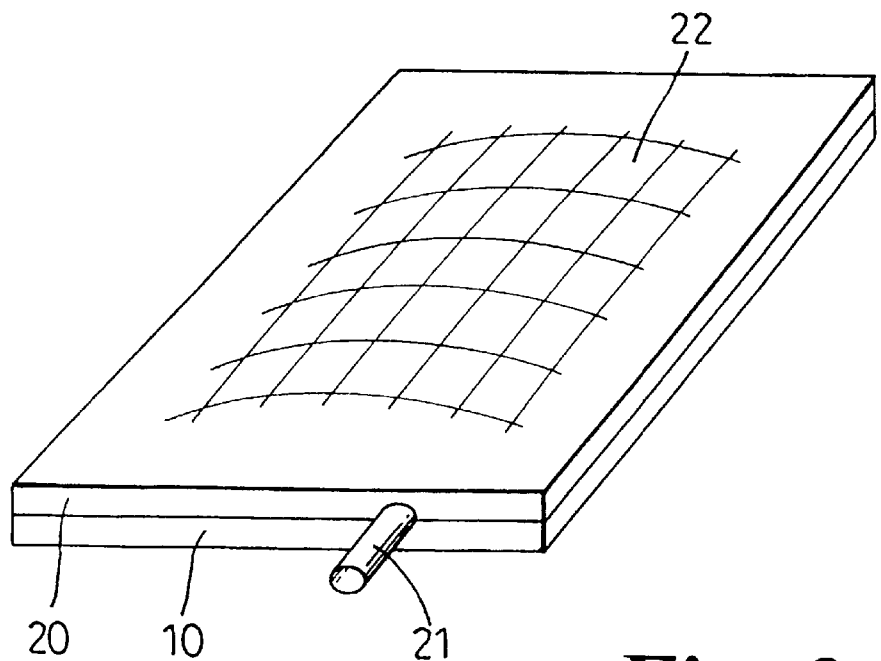
FIG. 2 is a perspective view of an assembled water bed incorporating the component part of FIG. 1.
Figure 3:
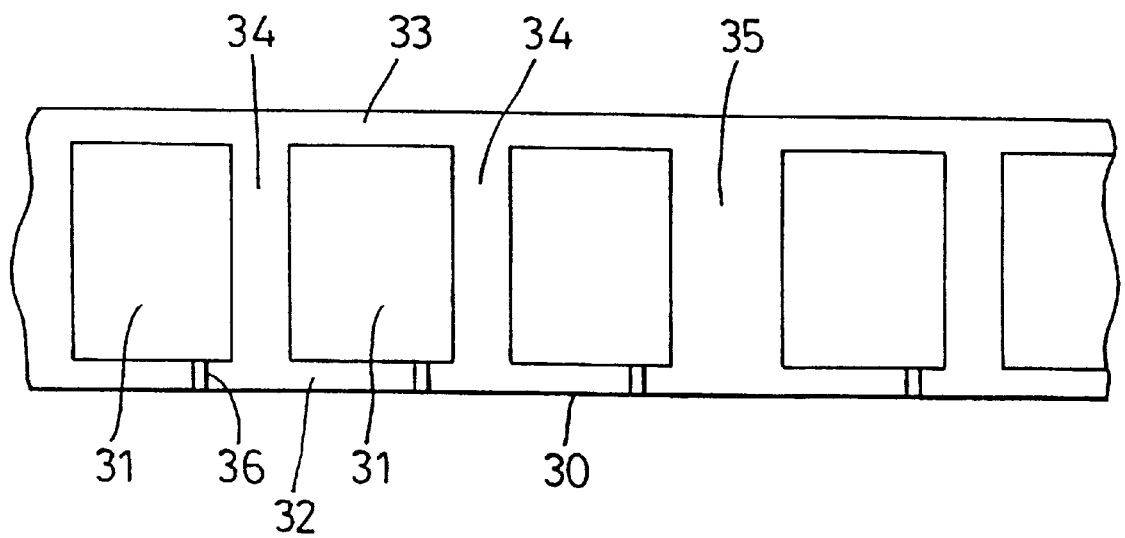
FIG. 3 is a plan view of part of an elongate assembly of water beds at a first stage of manufacture.
Figure 4:
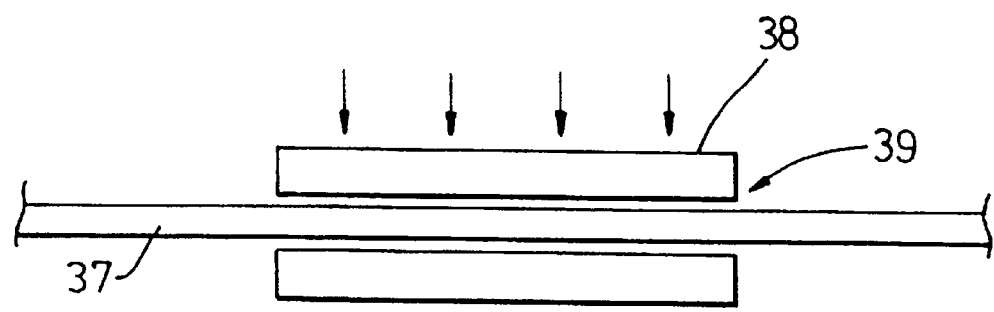
FIG. 4 is a schematic view of apparatus for use in the manufacture of an elongate assembly of water beds.

For the manufacture of a single heavy duty water bed suitable for use for cows and other such livestock there is provided a first flexible layer 10 of synthetic rubber having embedded therein a woven reinforcing fabric 11 of rayon.

A mask insert 13 of a material such as polyester, which does not inherently tend to bond to unvulcanised rubber during vulcanisation, is placed on an upper surface 12 of the unvulcanised layer 10.

The mask insert 13 is pre-selected in shape so that when it is positioned centrally of the surface 12 there is formed a border zone 14 of a width in the order of 75 to 125 mm, the border zone extending continuously around the mask insert 13 except near to one corner at which a flat rubber tube 15 is provided and arranged to extend with one end adjacent an edge 16 of the layer 10 and another end 17 slightly overlying the mask 13.

A second layer 20 of reinforced rubber, of a construction corresponding to that of layer 10, is then laid over the boundary surface 14 and mask 13. The resulting assembly is subjected to a vulcanisation process during which the layers 10 and 20 are vulcanised to one another at the boundary zone 14.

Subsequently a valve device/collector 21 is fitted to the tube 15.

The resulting assembly is then injected with water through the tube 15 into the fluid chamber zone 22 defined between the confronting, unbonded central zones of the layers 10 and 20 outside of the mask layer 13.

When the required quantity of water (or other liquid) is in the fluid chamber, the valve 21 is closed to seal the chamber 22.

For the manufacture of an elongate series of water beds suitable for laying in a continuous strip to cover the floor areas of a plurality of neighbouring cow cubicles an elongate strip 30 of unvulcanised, reinforced rubber, corresponding in construction to the aforedescribed layer 10, has a series of mask inserts 31, placed thereon.

Each mask corresponds to the aforedescribed mask 13, and the masks lie at positions spaced apart in the direction of the length of the strip 30.

Edge boundary zones 32, 33 at opposite side edges of the strip 30 are of a similar transverse width, and some of the transversely extending boundaries zones 34 are also of that width.

At intervals along the length of the series of mask inserts there are transverse boundary zones 35 of a double width.

Alongside each mask insert 31 there is provided a lay flat tube 36 for subsequent connection of a valve, the tube 36 corresponding to the aforedescribed tube 15.

To complete the assembly a second layer of unvulcanised material corresponding to the layer 30 is placed over the layer 30, the mask 31 and tubes 36. The resulting assembly 37 is then advanced in step wise manner through a platen press 38. At the exit region 39, subsequent to the vulcanised material having cooled sufficiently, the lay flat tubes 36 are each fitted with valve devices which are closed to prevent unwanted entry of air into the fluid chamber zones defined by the respective mask inserts. If necessary a pump or other means is used to withdraw unwanted air from the fluid chamber zones prior to closure of the tubes.

What is claimed is:

1. Method for the manufacture of a heavy-duty flexible container comprising:

providing a first layer of flexible vulcanizable polymeric material;

applying mask means to an inner zone of a first surface of said first layer, said mask means comprising at least one layer of continuous solid material and being arranged spaced from edges of the first layer thereby to define a substantially continuous peripheral boundary zone;

providing a second layer of flexible vulcanizable polymeric material;

arranging said second layer to lie adjacent said first layer so as to form an assembly comprised of both layers with the mask means sandwiched therebetween, said mask means a) preventing confronting surfaces of the first and second layers from coming into contact inwards of the boundary zone, and b) not adhering to the confronting surface materials of either the first or second layers; and subjecting the assembly to a treatment operation comprising the application of heat and pressure thereby to vulcanize said vulcanizable material and to form a vulcanized joint between said boundary zone and confronting surface region of the second layer, wherein said mask means comprise two layers of material which do not adhere to one another when subject to the temperature and pressure of said vulcanization.

2. Method in accordance with claim 1, wherein each of said first and second layers comprises a substantially wholly unvulcanized polymeric material.

3. Method in accordance with claim 1, wherein at least one of said first and second layers is a reinforced vulcanizable polymeric material.

4. Method in accordance with claim 3, further comprising forming at least one of said first and second layers from a material comprising reinforcement sandwiched between two sublayers of vulcanizable polymeric material.

5. Method in accordance with claim 4, wherein the two sublayers are of the same vulcanizable polymeric material.

6. Method in accordance with claim 1, wherein at least one of said first and second layers is a calendered material.

7. Method in accordance with claim 1, further comprising forming at least one of said first and second layers from a reinforced material having a reinforcement which provides reinforcement strength in two mutually perpendicular directions.

8. Method in accordance with claim 1, wherein the mask means is arranged to extend locally to an edge of the first layer to provide a localized region at which the first layer does not become adhered to the second layer.

9. Method in accordance with claim 1, further comprising tube means arranged to extend through the boundary zone prior to the first and second layers being joined together.

10. Method in accordance with claim 9, wherein the tube means comprises a flexible and lay flat tube.

11. Method in accordance with claim 9, wherein the mask means comprises a pair of superimposed layers and an inner end of the tube means is arranged to lie between said superimposed layers.

12. Method in accordance with claim 1, further comprising providing valve means prior or subsequent to said treatment operation for control of fluid into and out of a fluid chamber formed between said first and second layers.

13. Method in accordance with claim 12, further comprising providing a sealing device adapted to prevent unwanted air from entering said fluid chamber.

14. Method in accordance with claim 1, wherein the boundary zone has a width of at least 10 mm.

15. Method in accordance with claim 14, wherein the boundary zone has a width of at least 50 mm.

16. Method in accordance with claim 14, wherein at least a part of the boundary zone has a width of less than 200 mm.

17. Method in accordance with claim 1, wherein an outwardly facing surface of the flexible container is provided with a profiled surface.

18. Method in accordance with claim 17, wherein said profiled surface is formed during a vulcanization procedure.

* * * * *